Patented July 15, 1924.

1,501,086

UNITED STATES PATENT OFFICE.

JOSEPH ZIMMERMAN, OF DAYTON, OHIO.

GASOLINE-CLEANING COMPOSITION.

No Drawing.     Application filed June 15, 1922. Serial No. 568,651.

*To all whom it may concern:*

Be it known that I, JOSEPH ZIMMERMAN, a citizen of the United States, residing in the city of Dayton, in the county of Montgomery and State of Ohio, have invented a new and useful Gasoline-Cleaning Composition, of which the following is a specification.

The principal object of my invention is to provide a composition for cleaning or settling gasoline or a similar hydrocarbon, so that it may be fully recovered for further use after becoming dirty through employment as a cleaning agent. My composition is economical to produce, and a small quantity of it will cleanse a large amount of gasoline.

My new composition, when added to water, will also form an effective household washing solution.

The composition preferably comprises the following ingredients mixed together in the following proportions:

|  | Quarts. |
|---|---|
| Two pounds of olive oil soap dissolved in one quart of water | 2 |
| Denatured alcohol | 1½ |
| Carbon tetrachloride | ⅜ |
| Three ounces of caustic soda dissolved in water | ⅛ |

In my cleaning solution I prefer to employ olive oil soap because of its free solubility, although any other similar soap may be used if desired. Denatured alcohol is employed as an extremely good solvent. Since soap, alcohol and water will not mix readily with gasoline, carbon tetrachloride is added to the composition to spread these substances thoroughly through the solution. Carbon tetrachloride is also a solvent of organic substances, and has a certain saponaceous effect. The caustic soda is added to facilitate hydrolysis, with the result that the entire admixture thoroughly separates the grease and dirt from the gasoline. Then, as the heavy soap and alcohol settle to the bottom of the solution, they carry the separated foreign matter down with them, leaving the gasoline above the sediment clear and clean.

One quart of my composition will thoroughly cleanse two hundred gallons of dirty gasoline so that the latter may be used over and over again for cleaning purposes. My composition may also be added to water to make a cleaning fluid of extreme value in the household.

Having described my invention, I claim:

A cleansing composition consisting of olive oil soap and water, two quarts; denatured alcohol, one and one half quarts; carbon tetrachloride, three eighths of a quart; and caustic soda and water, one eighth quart.

In testimony whereof I have hereunto set my hand this 13th day of June, 1922.

JOSEPH ZIMMERMAN.

Witness:
   HOWARD S. SMITH.